United States Patent [19]

Bateman

[11] Patent Number: 4,495,483
[45] Date of Patent: Jan. 22, 1985

[54] GROUND PROXIMITY WARNING SYSTEM WITH TIME BASED MODE SWITCHING

[75] Inventor: Charles D. Bateman, Bellevue, Wash.

[73] Assignee: Sundstrand Corporation, Rockford, Ill.

[21] Appl. No.: 259,131

[22] Filed: Apr. 30, 1981

[51] Int. Cl.³ ............................. G01C 5/00; G01S 9/04
[52] U.S. Cl. ................................... 340/970; 73/178 T; 340/960; 364/433
[58] Field of Search .......... 340/27 R, 27 NA, 27 AT; 73/178 R, 178 T; 244/180, 183, 181, 175; 364/427, 433; 343/7 TA, 112 A, 112 CA

[56] References Cited

U.S. PATENT DOCUMENTS

| | | | |
|---|---|---|---|
| 3,715,718 | 2/1973 | Astengo | 340/27 R |
| 3,934,222 | 1/1976 | Bateman et al. | 340/27 AT |
| 3,936,796 | 2/1976 | Bateman | 340/27 AT |
| 3,944,968 | 3/1976 | Bateman et al. | 340/27 AT |
| 3,946,358 | 3/1976 | Bateman | 340/27 R |
| 3,947,810 | 3/1976 | Bateman et al. | 340/27 AT |
| 3,958,218 | 5/1976 | Bateman | 340/27 R |
| 4,030,065 | 6/1977 | Bateman | 340/27 AT |
| 4,215,334 | 7/1980 | Bateman | 340/27 AT |

Primary Examiner—James J. Groody
Attorney, Agent, or Firm—Michael B. McMurry; Ted E. Killingsworth; Harold A. Williamson

[57] ABSTRACT

To increase the effectivity of warnings and to decrease nuisance warnings in a ground proximity warning system having several modes of operation, the switching from one mode to another is done as a function of time. In addition, in a ground proximity warning system where a warning signal is generated in accordance with a predetermined relationship between flight parameters, one or more of these parameters can be varied as a function of time in order to, for example, increase the altitude above ground as a function of time from take-off that a terrain clearance warning may be generated or to decrease as a function of time, the radio altitude below which a negative take-off after a climb warning may be generated.

23 Claims, 11 Drawing Figures

GROUND PROXIMITY WARNING SYSTEM WITH TIME BASED MODE SWITCHING

TECHNICAL FIELD

The invention relates to the field of aircraft ground proximity warning systems and, in particular, to systems with more than one mode of operation.

BACKGROUND OF THE INVENTION

Ground proximity warning systems as presently used in commercial aircraft have five or six modes of operation. A mode of operation refers to the criteria that is used to generate a pilot warning. For example, in a terrain closure mode of operation the altitude of the aircraft above the ground is compared with the rate of closure of the aircraft to the ground and if the closure rate exceeds a predetermined rate for a particular altitude above the ground, a warning is generated. This particular mode of operation is illustrated in U.S. Pat. Nos. 3,715,718, 3,936,796, 3,934,222 and 3,958,218.

Other warning modes include: negative climb after take-off, terrain clearance, excessive sink rate and below glide slope warning modes. A ground proximity warning system employing these types of warning modes is described in U.S. Pat. No. 3,946,358. In the type of ground proximity warning system described in this patent, various warning modes are used depending upon the phase of aircraft flight. During take-off, for instance, the negative climb after take-off mode is activated which will generate a warning if the aircraft should descend with respect to barometric altitude before reaching 700 feet above ground level. Various forms of this warning mode are illustrated in U.S. Pat. No. 3,947,810 and Bateman U.S. patent application Ser. No. 109,580, filed Jan. 4, 1980 as well as in U.S. Pat. No. 3,946,358. After the aircraft has reached an altitude of 700 feet above ground level the ground proximity warning system will switch from the negative climb after take-off mode to a terrain clearance mode which provides a pilot warning in the event the aircraft should descend below a predetermined altitude with respect to the ground. Along with U.S. Pat. No. 3,946,358, U.S. Pat. Nos. 3,944,968 and 4,030,065 describe terrain clearance type warning modes. This mode normally remains in operation until the aircraft is placed in a landing configuration with the landing gear or flaps lowered.

The applicant believes that the warning coverage of the ground proximity warning system can be improved by changing the criteria by which the switch from the negative climb after take-off mode to the terrain clearance mode is made. Specifically, this change relates to the set of circumstances where the aircraft takes off over terrain that is sloping upwardly and the aircraft never reaches 700 feet above the ground to activate the terrain clearance mode as required in the prior art systems. As a result, the aircraft could approach the ground while still climbing with respect to barometric altitude without a warning being generated.

In addition, it has been discovered that it is possible under certain conditions for a prior art system to get a nuisance or an unwanted warning in the event, for example, the aircraft climbs above 700 feet above ground thereby switching the ground proximity warning system into the terrain clearance mode but the aircraft speed is such that the terrain clearance mode will generate a warning at 1000 feet or below. Since the aircraft is at about 700 feet when the switch in modes occurs, a warning will be generated which may not be warranted by the circumstances.

SUMMARY OF THE INVENTION

It is therefore an object of the invention to provide a ground proximity warning system having at least two warning modes with improved warning coverage wherein switching from one mode to another is done as a function of time.

It is another object of the invention to provide a ground proximity warning system with improved warning coverage wherein a warning is generated in accordance with a predetermined relationship between flight parameters and the predetermined relationship is varied as a function of time.

It is a further object of the invention to provide a ground proximity warning system with improved warning coverage having a first warning mode wherein a warning is generated when the aircraft is descending with respect to barometric altitude during take-off when the aircraft is below a first predetermined radio altitude where this first predetermined altitude is decreased as a function of time and a second warning mode wherein a second warning signal is generated when the aircraft descends below a second predetermined radio altitude where the second predetermined radio altitude is increased as a function to time.

BREIF DESCRIPTION OF THE DRAWINGS

DETAILED DESCRIPTION OF THE INVENTION

Figure 1:
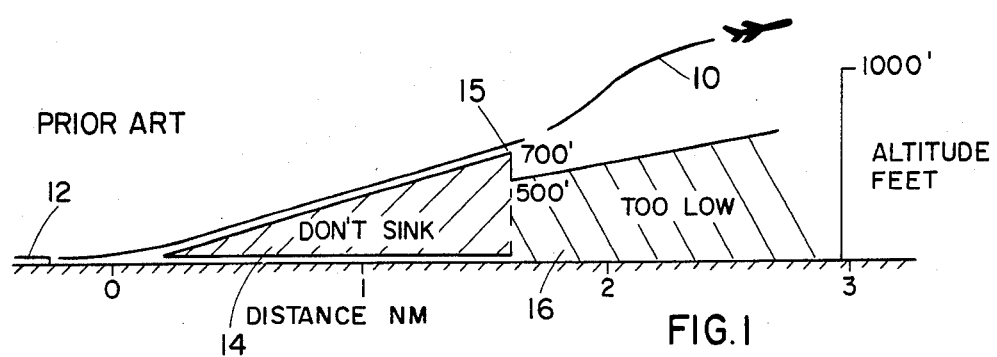
FIG. 1 is a graphical representation of a first aircraft flight path illustrating a mode switching operation of a prior art ground proximity warning system.

To illustrate the operation of a prior art ground proximity warning system having a number of different operating modes of the type disclosed in U.S. Pat. No. 3,946,358, a flight path 10 of an aircraft taking off from an airport runway 12 is shown in FIG. 1. During the take-off phase of flight, the ground proximity warning system is operating in a negative climb after take-off mode as represented by the first shaded area 14 under the flight path 10. If the aircraft should descend with respect to barometric altitude at a greater than a predetermined rate in accordance with the negative climb after take-off warning mode described in U.S. Pat. No. 3,946,358 or if the aircraft should lose a predetermined amount of altitude in accordance with the negative climb after take-off warning mode described in U.S. Pat. No. 3,947,810 and U.S. patent application Ser. No. 109,580 before the aircraft reaches an altitude of 700 feet above ground level, a voice warning typically using the words "don't sink" will be generated. After the aircraft achieves an altitude of 700 feet above ground, the ground proximity warning system will switch at point 15 from the negative climb after take-off warning mode to the terrain clearance warning mode as represented by the second shaded area 16 in FIG. 1. In the terrain clearance mode, a voice warning such as "too low, terrain" is generated when the aircraft descends below a predefined altitude with respect to the ground. Terrain clearance warning modes are described in the U.S. Pat. Nos. 3,946,358, 3,944,968 and 4,030,065.

Figure 2:
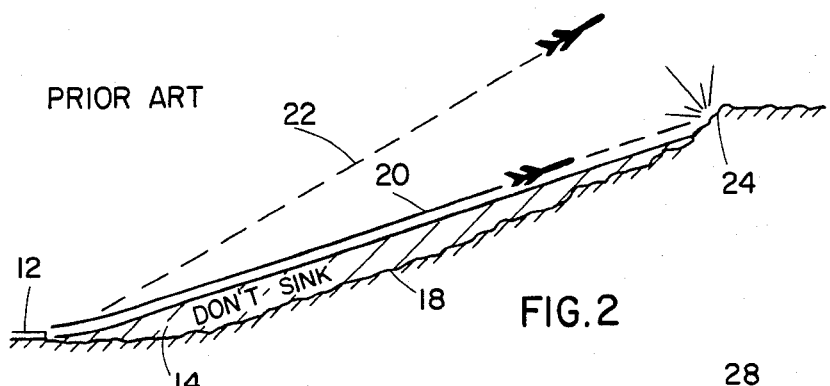
FIG. 2 is a graphical representation of a second aircraft flight path over rising terrain illustrating operation of the prior art ground proximity warning system.

The warning system as illustrated in FIG. 1 works quite well for most situations. However, the applicant believes that the mode switching arrangement shown in FIG. 1 could be modified to generate a warning under circumstances in addition to those circumstances that produced warnings in prior art systems. An example of the set of circumstances for which the system can be improved so as to provide a timely warning is illustrated in FIG. 2. In this situation the terrain is sloping in an upward direction approximately parallel to an aircraft flight path 20. The flight path that the aircraft would normally be expected to follow is indicated by the dashed line 22 but it is assumed for this example that the aircraft is inadvertently flying on the lower flight path 20. Since the aircraft flight path 20 never is greater than 700 feet above ground level, the prior art ground proximity warning system will not switch from the negative climb after take-off mode 14 to the terrain clearance mode 16 as shown in FIG. 1. As a result, since the aircraft is gaining barometric altitude, there will not be a warning generated before the aircraft approaches the terrain 18 at point 24.

Figure 3:
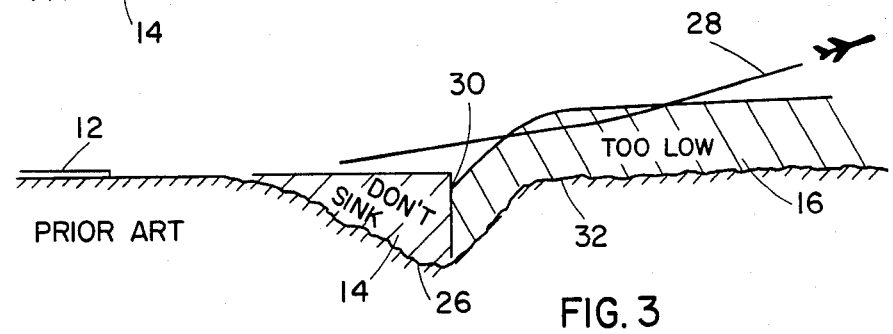
FIG. 3 is a graphical representation of a third aircraft flight path over terrain having a dip illustrating the mode switching operation of the prior art ground proximity warning system.

A set of circumstances in which a nuisance warning would be generated by the system of FIG. 1 is illustrated in FIG. 3 where there is a substantial dip 26 in the terrain underneath the aircraft flight path 28 that will cause the ground proximity warning system to switch from the negative climb after take-off mode 14 to the terrain clearance mode 16 at point 30. On the other side 32 of the dip 26 where the terrain returns to approximately the level of the runway 12, a warning will be generated since the flight path 28 has not exceeded the altitude at which terrain clearance warnings 16 are discontinued. In effect, the dip 26 in the terrain will have caused the ground proximity warning system to have prematurely switched from the negative climb after take-off mode 14 to the terrain clearance mode 16.

Figure 4:
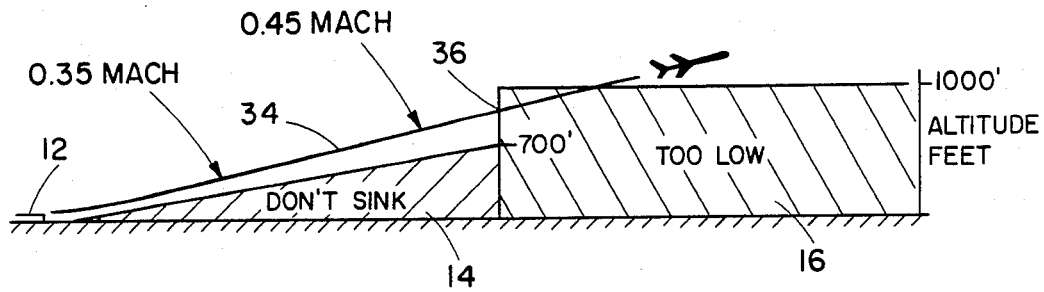
FIG. 4 is a graphical representation of a fourth aircraft flight path illustrating the mode switching operation of the prior art ground proximity warning system.

Another set of circumstances in which a nuisance warning can be generated over substantially flat terrain is illustrated in FIG. 4. Such a warning will occur in a ground proximity warning system having a terrain clearance mode of the type described in U.S. Pat. No. 4,030,065 where the maximum altitude at which a warning 16 is given increases with speed. As an example, once the aircraft reaches a speed of mach 0.45, the maximum altitude at which a warning is given is increased to 1000 feet from the nominal level of 500 feet. As a result, when an aircraft having a flight path 34 accelerates to a speed of 0.45 mach before gaining an altitude of 700 feet above ground level, a nuisance warning will be generated at point 36 where the aircraft exceeds 700 feet of altitude.

Figure 5:
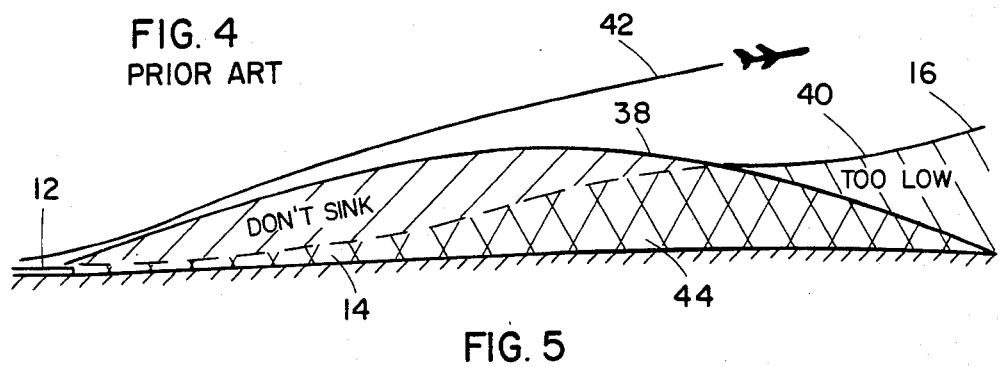
FIG. 5 is a graphical representation of an aircraft flight path illustrating the operation of a ground proximity warning system with mode switching based on time.

To improve the system described above, a mode switching system based on time was developed. The operation of this system is illustrated in FIG. 5. In this system, the maximum altitude above ground, indicated by line 38, at which a negative climb after take-off warning 14 can be generated is decreased as a function of time and the maximum altitude indicated by line 40, at which a terrain clearance warning 16 can be generated is increased as a function of time from when the aircraft takes off from the runway 12. The aircraft flight path is indicated by line 42. As can be seen from the double cross-latched portion 44 of FIG. 5, there will be an area of double protection between the negative climb after take-off mode and the terrain clearance mode. The time switching of modes as shown in FIG. 5 will provide a warning under the circumstances shown in FIG. 2 and eliminate the nuisance warning illustrated in FIGS. 3 and 4.

Figure 6:
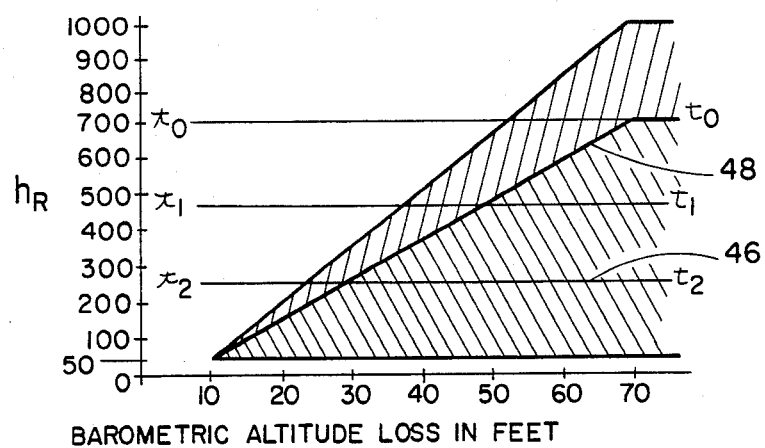
FIG. 6 is a graphical illustration of the relationship between radio altitude and barometric altitude loss to generate a warning in a descent after take-off warning mode of operation wherein the upper radio altitude limit at which a warning can be generated is decreased with time.

An illustration of the relationship between altitude above ground, which is normally measured by means of a radio altimeter in a ground proximity warning system and indicated by $h_R$, and altitude loss required to generate a warning is indicated in FIG. 6 by the cross-latched area 46 under line 48. As can be seen from the line 48, it takes a greater barometric altitude loss to generate a warning at greater radio altitudes. In order to describe the invention, lines $t_0$, $t_1$ and $t_2$ are provided in FIG. 6 to illustrate the maximum radio altitudes at which a negative climb after take-off warning can be generated at discrete times $t_0$, $t_1$ and $t_2$. In the preferred embodiment of the invention, $t_0$ represents the time immediately after take off when the aircraft has passed through a minimum altitude such as 50 feet and indicates a negative climb after take-off warning can be produced up to 700 feet radio altitude. Time $t_1$ represents approximately one minute after take-off and where warnings of up to 466 feet of radio altitude are permitted and $t_2$ represents approximately two minutes after take-off where warnings of up to 233 feet of radio altitude are permitted. At approximately three minutes after take-off, $t_3$, the maximum radio altitude $h_R$ at which a warning could be generated, would be below 50 feet thereby effectively eliminating this mode.

Figure 7:
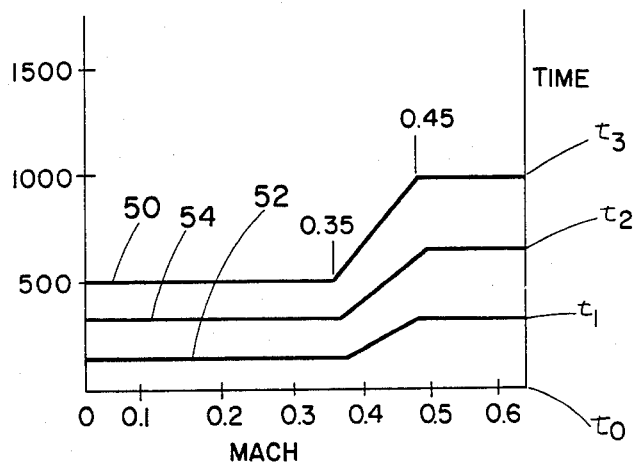
FIG. 7 is a graphical illustration of the relationship between radio altitude and aircraft speed measured in mach to generate a warning in a terrain clearance mode of operation wherein the upper altitude limit at which a warning can be generated is increased with time.

An illustration of the warning criteria of a terrain clearance mode of the type described in U.S. Pat. No. 4,030,065 is provided in FIG. 7. In this particular warning mode, the radio altitude at which a warning is generated is increased as a function of the aircraft speed as measured in mach. During the in-flight phase of operation, the maximum altitude at which a warning can be given is 500 feet which increases to 1000 feet at mach 0.45 as indicated by the line 50. In the invention, the maximum altitude at which a warning could be generated at $t_0$ just after take-off would be under 50 feet of radio altitude which would effectively eliminate the operation of this mode. At time $t_1$, the maximum altitude would be limited to about 166 feet for speeds under 0.35 mach and as indicated by line 52 the altitude would be limited to 333 feet for speeds of greater than 0.35 mach. Two minutes after take-off at $t_2$ the maximum altitude would be limited to about 333 feet for speeds under 0.35 mach and as shown by line 54 increase to about 666 feet at speeds of 0.45 mach and greater. After three minutes of flight, $t_3$, the altitude limits would be as indicated by line 50 thereby resulting in the terrain clearance mode being fully operational.

Figure 8:
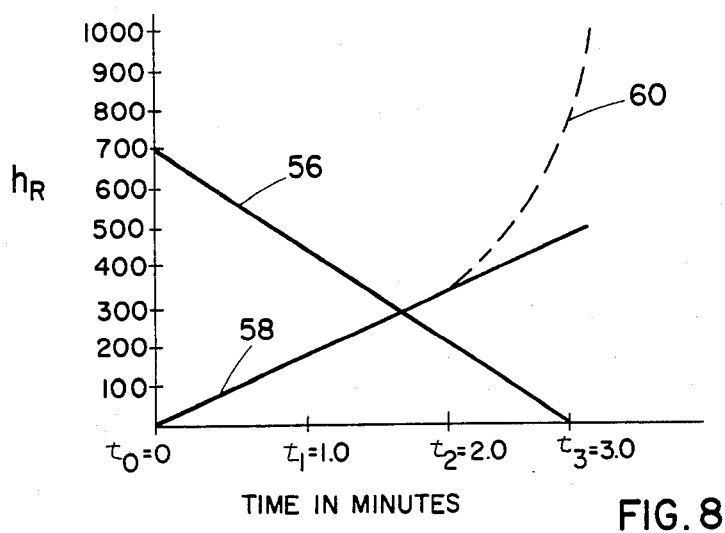
FIG. 8 is a graphical illustration of the variation of the radio altitude limits of the warning modes of FIGS. 6 and 7 with time.

A comparison of the maximum altitude limits for the negative climb after take-off mode and the maximum limits for the terrain clearance mode is shown in FIG. 8. Line 56 represents the maximum altitude at which a negative climb after take-off warning can be given and line 58 represents the maximum altitude at which a terrain clearance warning can be given as a function of time t after take-off. The dashed line 60 represents the maximum altitude limits for the terrain clearance mode assuming the aircraft increases speed from 0.35 mach at $t_2$ to 0.45 mach at $t_3$.

Figure 9:
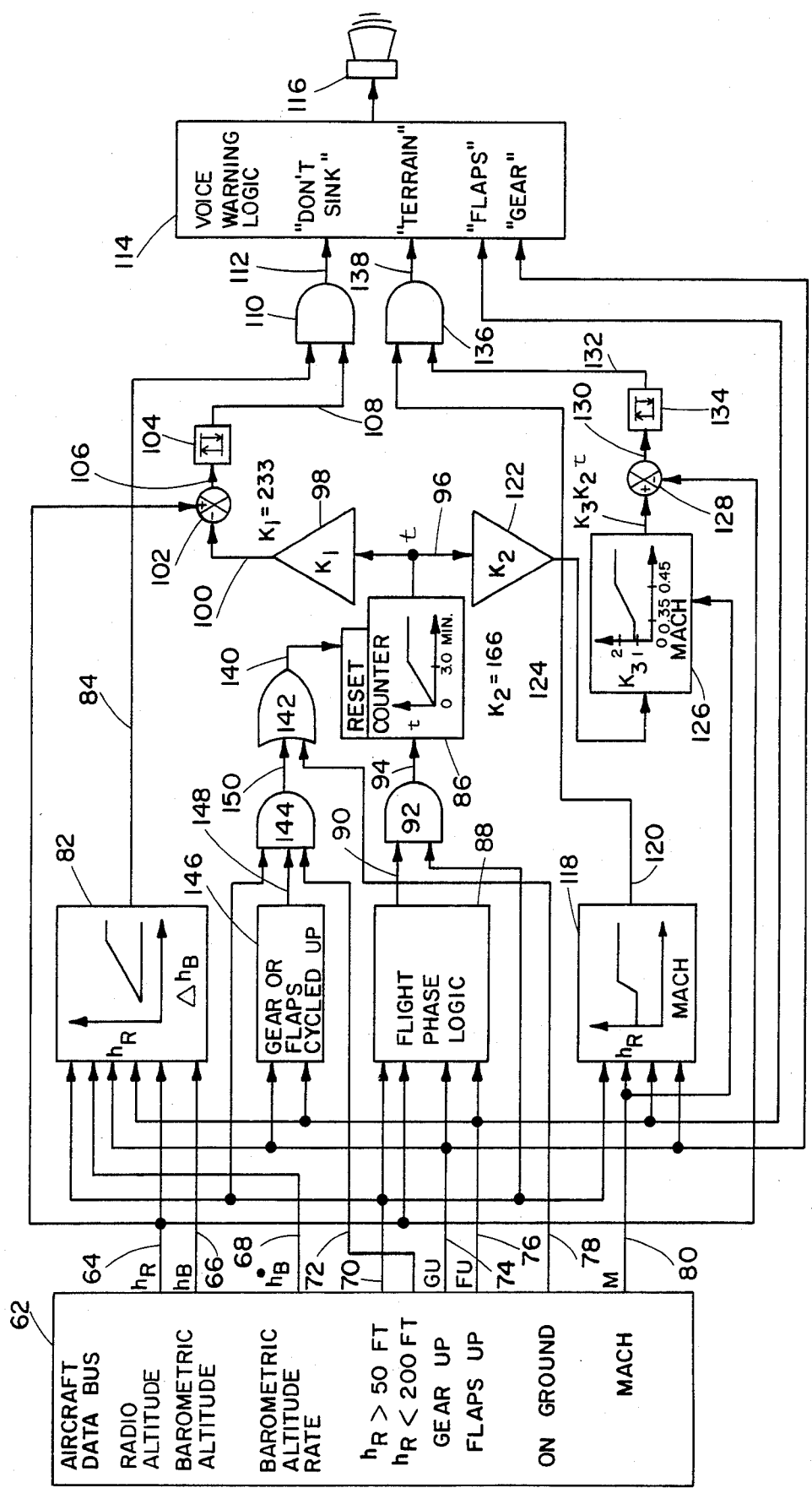
FIG. 9 is a functional block diagram of a circuit for implementing the system of FIGS. 5, 6, 7, 8 and 9.

A block diagram for implementing the preferred embodiment of the invention is provided in FIG. 9. A source of signals to be used in the system is represented by an aircraft data bus 62. Flight parameter signals provided by the data bus 62 include: radio altitude $h_R$ on line 64; barometric altitude $h_B$ on line 66; barometric altitude rate $\dot{h}_B$ on line 68; a logic signal indicating that the aircraft is above 50 feet of radio altitude on line 70; a logic signal indicating that the aircraft is below 200 feet of radio altitude on line 72; logic signals GU and FU on lines 74 and 76 respectively indicating that the landing gear is up or that the flaps are up; a logic signal on line 78 indicating that the aircraft is on the ground; and an aircraft speed signal M calibrated in mach on line 80.

A functional logic circuit 82 responsive to the $h_R$, $h_B$, $\dot{h}_B$, GU, FU and below 50 feet signals on lines 64, 66, 68, 74, 76 and 70 respectively, generates a logic signal on line 84 indicating that a negative climb after take-off warning should be given. Systems for implementing the type of logic that could be used in the logic circuit are well known and examples are described in U.S. Pat. Nos. 3,946,358 and 3,947,810 as well as U.S. patent application Ser. No. 108,580. A relationship between radio altitude $h_R$ and barometric altitude loss required to generate a warning logic signal on line 84 is, for example, illustrated by line 48 in FIG. 6.

In order to provide a decrease in the maximum altitude at which a negative climb after take-off warning is given as a function of time as illustrated in FIGS. 5, 6 and 8, a logic circuit including a counter 86 is combined with the signal on line 84 to effectively limit the maximum altitude. A flight phase logic circuit 88, responding to the less than 50 feet of radio altitude signal and the GU and FU signals, on line 90 indicates that the aircraft is in a take-off phase of operation. Such logic circuits 88 and systems are well known and are described in detail in U.S. Pat. Nos. 3,946,358 and 3,947,810. When the aircraft is in a take-off phase of flight, the logic signal on line 90 will be combined with the logic signal on line 70 in an AND gate 92 and when the aircraft passes through 50 feet of radio altitude, a logic signal on line 94 will start the counter 86. As the output t of counter 86 on line 96 increases with time a scaling amplifier 98 will generate a signal on line 100 proportional to altitude. The scaling factor $K_1$ as shown in FIG. 9 will produce a value of 700 feet on line 100 at a time t of three minutes or greater. The altitude scaled signal on line 100 is subtracted from radio altitude $h_R$ on line 64 in a summing junction 102 and the result is applied to a comparator 104 over line 106. When the signal on line 106 is zero or less the comparator 106 output on line 108 will go low. Since lines 108 and 84 are connected to an AND gate, the net result will be the prevention of a negative climb after take-off according to the time relation shown by line 56 in FIG. 8. If the negative climb after take-off signal is generated on line 84 and if the output of summing junction 102 is positive, then AND gate 10 will transmit a logic signal on line 112 to a voice warning logic circuit 114 which will cause a speaker 116 to generate a voice warning saying "don't sink".

Responsive to the $h_R$, GU, FU and M signals on lines 64, 74, 76 and 80 respectively is a terrain clearance warning function generator 118 of the type described in detail in U.S. Pat. No. 4,030,065. When the aircraft is below a predetermined radio altitude for a predetermined speed as shown for example by line 50 of FIG. 7, then a warning logic signal will be generated on line 120. However, in order to vary the maximum altitude at which a terrain clearance warning can be given as a function of time, the t signal on line 96 is applied to a scaling amplifier 122. The scaling factor $K_2$ of 166 will cause the signal on output line 124 of the scaling amplifier 122 to be equal to 500 feet when three minutes from take-off has elapsed. This signal is then applied to a function generator 126 having a mach input on line 80 and a scaling factor $K_3$ that increases from a value of 1 at 0.35 mach to 2 at 0.45 mach. The resulting output of the function generator 126 which is equal to $K_2 K_3 t$ is applied to a summing junction 128. Subtracted from this signal in the summing junction 128 is the $h_R$ signal on line 64 which when the output 130 of the summing junction is zero or less will cause the output 132 of a comparator 134 to go low. As a result, an AND gate 137 with output 138 will prevent the generation of a "terrain" type voice warning when t is equal to zero but will permit the radio altitude at which a warning is generated to be increased as a function of time in accordance with lines 58 or 60 of FIG. 8. The function generator 126 will have the effect of increasing the maximum altitude for which a terrain clearance warning can be generated as a function of aircraft speed M as for example shown by line 60 of FIG. 8.

The counter 86 is reset to zero by means of a signal on line 140 transmitted through an OR gate 142. A signal on line 78 indicating that the aircraft is on the ground will cause the counter to reset. In addition, if the aircraft should perform a missed approach below 200 feet radio altitude, the counter 86 will be reset thus activating the negative climb after take-off mode. An AND gate receives inputs from lines 70 and 72 indicating that the aircraft is between 50 and 200 feet and from a logic circuit 146 over line 148 that indicates when either the aircraft flaps or landing gear has been cycled up. A logic signal on the output 150 of AND gate 144 will cause the counter 86 to reset.

In addition to the above described system wherein the maximum altitude limits of the warning modes vary as a function of time, it may be desirable to switch from one mode to another at a certain predetermined time. For instance the circuit of FIG. 9 could be modified by disconnecting lines 64 from the summing junctions 102 and 128 and setting comparators 104 and 134 such that AND gates will effectively switch warning modes from the negative climb after take-off mode to the terrain clearance mode at a predetermined time. The comparators 104 and 134 would be set to switch output states at a predetermined time under this arrangement.

Figure 10:
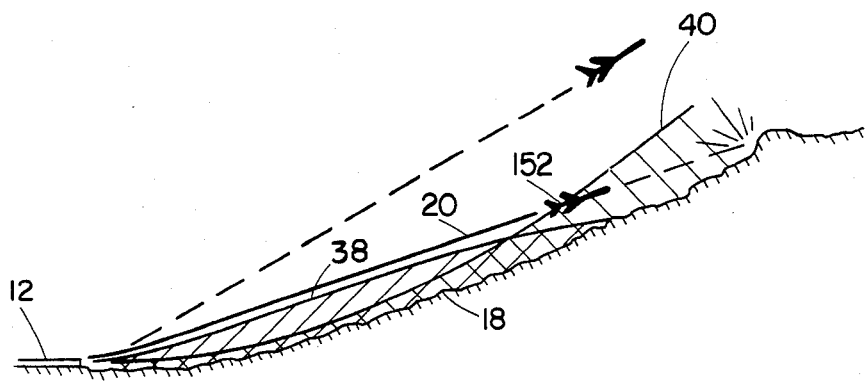
FIG. 10 is a graphical representation of the aircraft flight path of FIG. 2 illustrating a ground proximity warning system with mode switching based on time.

An example of the improved warning coverage provided by the type of warning system shown in FIG. 9 is illustrated by the flight path in FIG. 10. The terrain 18 and the flight path 20 is the same as in FIG. 2 and the altitudes at which warnings are given are similar to those shown in FIG. 5. Specifically, the maximum altitude above ground at which a negative climb after take-off warning 14 can be generated is indicated by line 38 and the maximum altitude at which a terrain clearance warning 16 can be generated is indicated by line 40. In this example at point 152 where the aircraft flight path intersects line 40, a warning will be generated thereby providing warning coverage that was not available in the prior art system illustrated in FIG. 2.

Figure 11:
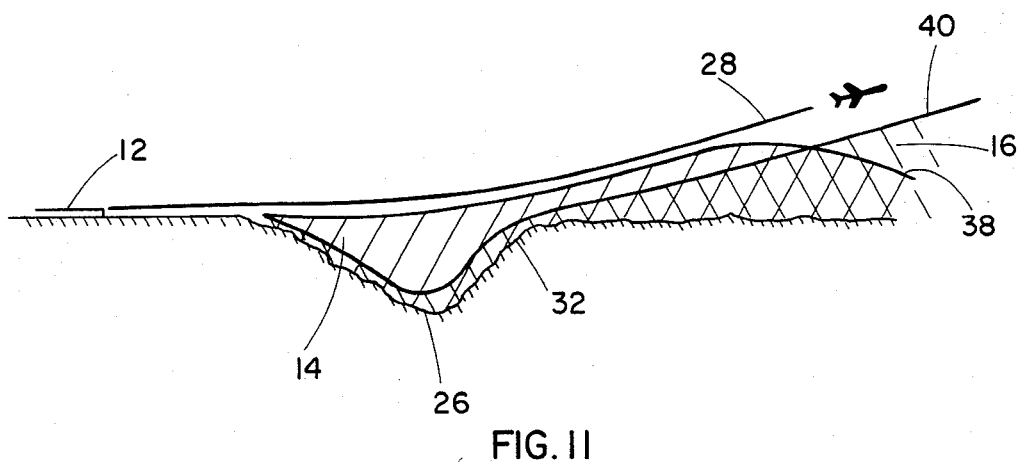
FIG. 11 is a graphical representation of the aircraft flight path of FIG. 3 illustrating the operation of a ground proximity warning system with mode switching based on time.

Similarly, the type of warning system shown in FIG. 9 serves to reduce nuisance warnings. The flight path 28 and the terrain profiles 26 and 32 of FIG. 11 are the same as in FIG. 3 which serves to illustrate how the system of FIG. 9 can reduce the nuisance warnings of the sort shown in FIG. 3. Since the mode switching system of FIG. 9 is not triggered by the dip 26 in the terrain and since the flight path 28 does not intersect either the negative climb after take-off warning line 38 or the terrain clearance warning line 40, there will not be a nuisance warning generated for the flight situation illustrated in FIGS. 2 and 11. Also, by comparing FIGS. 4 and 5, it is apparent how the type of warning system shown in FIG. 9 can reduce the type of nuisance warnings illustrated in FIG. 4.

I claim:

1. A ground proximity warning system for aircraft comprising:
   a source of signals representing aircraft flight parameters;
   a source of a signal representing time;
   a first warning mode means responsive to said flight parameter signals for generating a first warning signal in accordance with a first predetermined relationship between flight parameters;
   a second warning mode means responsive to said flight parameter signals for generating a second warning signal in accordance with a second predetermined relationship between flight parameters; and
   means responsive to said time signal for switching from said first warning mode means to said second warning mode means as a function of time.

2. A ground proximity warning system for aircraft comprising:
   a source of signals representing aircraft flight parameters;
   a source of a signal representing time;
   means responsive to said flight parameter signals for generating a warning signal in accordance with a predetermined relationship between parameters; and
   means responsive to said time signal and operatively connected to said warning signal generating means for varying as a function of time said predetermined relationship.

3. The system of claim 2 wherein said source of flight parameter signals include a source of barometric altitude signals and radio altitude signals and said predetermined relationship will result in the generation of said warning signal when the aircraft is descending with respect to barometric altitude when the aircraft is below a predetermined radio altitude and wherein said varying means reduces said predetermined radio altitude as a function of time.

4. The system of claim 2 wherein said source of flight parameter signals includes a source of radio altitude signals; and said warning signal generating means generates said warning signal when the aircraft is below a predetermined radio altitude and wherein said varying means increases said predetermined radio altitude as a function of time.

5. The system of claim 4 wherein said source of time signal includes means responsive to said radio altitude signal for starting said time signal when the aircraft has exceeded a predetermined minimum altitude.

6. The system of claim 5 wherein said source of flight parameter signals additionally includes a source of signals representing aircraft configuration and wherein said system includes means responsive to said configuration signals for generating a signal indicating that the aircraft is in a take-off phase of flight and wherein said time signal starting means responds to said phase of flight signal such that said time signal is started during the take-off phase of flight when the aircraft exceeds said predetermined minimum altitude.

7. The system of claim 4 wherein said source of flight parameter signals includes a source of aircraft configuration signals and said source of time signals includes means responsive to said configuration signals for starting said time signal when the aircraft is in a predetermined configuration.

8. The system of claim 7 wherein one of said configuration signals represents landing gear position and said time signal is started when the landing gear is raised.

9. The system of claim 7 wherein one of said configuration signals represents flap position and said time signal is started when the landing gear is raised.

10. The system of claim 4 wherein said varying means increased said predetermined radio altitude from a minimum altitude to a maximum altitude in a predetermined amount of time.

11. The system of claim 10 wherein said minimum altitude is 50 feet.

12. The system of claim 10 wherein said maximum altitude is 500 feet.

13. The system of claim 10 wherein said source of flight parameter signals also includes a source of airspeed signals and wherein said varying means increases said maximum altitude as a function of increasing airspeed.

14. The system of claim 10 wherein said predetermined amount of time is about 3 minutes.

15. The system of claim 4 wherein said source of flight parameter signals include a source of barometric altitude signals and said warning signal generating means additionally generates said warning signal when the aircraft is descending with respect to barometric altitude when the aircraft is below a predetermined radio altitude and wherein said varying means additionally reduce said predetermined radio altitude as a function of time.

16. The system of claim 15 wherein the maximum value of said predetermined radio altitude is 1000 feet.

17. The system of claim 15 wherein the time of reduction of said predetermined radio altitude from a maximum to a minimum is about 3 minutes.

18. A ground proximity warning system for aircraft comprising:
   a source of signals representing aircraft configurations;
   a source of a signal representing radio altitude;
   a source of a signal representing barometric altitude;
   a source of a signal representing time;
   means responsive to said configuration signals and said radio altitude signals for generating a signal indicating the aircraft phase of flight;
   a first warning means responsive to said radio altitude signal, said barometric altitude signal, said time signal and said phase of flight signal for generating a first warning signal when the aircraft is in a take-off phase of flight and is descending with respect to barometric altitude below a first predetermined radio altitude and including means responsive to said time signal to decrease said first predetermined radio altitude as a function of time; and
   a second warning means responsive to said radio altitude signal and said time signal for generating a second warning signal when the aircraft descends below a second predetermined radio altitude including means responsive to said time signal for increasing said second predetermined radio altitude as a function of time.

19. The system of claim 18 including means responsive to said phase of flight signal for starting said time signal during take-off.

20. The system of claim 19 wherein said second predetermined radio altitude increases to a maximum value of 1000 feet.

21. The system of claim 19 wherein said first predetermined radio altitude has a maximum value of 1000 feet.

22. The system of claim 19 wherein the time from the start of said time signal until said first predetermined radio altitude reaches a minimum is about 3 minutes.

23. The system of claim 18 additionally including a source of a signal representing aircraft speed and means responsive to said speed signal to increase said second predetermined radio altitude as a function of time.

* * * * *